United States Patent [19]

Buttery

[11] Patent Number: 5,290,445
[45] Date of Patent: Mar. 1, 1994

[54] FILTERING APPARATUS

[75] Inventor: Roger A. Buttery, Hampshire, England

[73] Assignee: Pall Corporation, East Hills, N.Y.

[21] Appl. No.: 69,668

[22] Filed: Jun. 1, 1993

Related U.S. Application Data

[63] Continuation of Ser. No. 895,239, Jun. 8, 1992, abandoned, which is a continuation of Ser. No. 357,258, May 26, 1989, abandoned.

[30] Foreign Application Priority Data

May 27, 1988 [GB] United Kingdom ................. 8812672

[51] Int. Cl.⁵ ............................................. B01D 27/04
[52] U.S. Cl. ..................................... 210/445; 210/453; 210/454; 210/455; 55/491; 55/503; 55/DIG. 5; 156/218
[58] Field of Search ................. 156/218; 210/445, 453, 210/454, 446, 232, 447, 455; 55/491, 503, DIG. 5

[56] References Cited

U.S. PATENT DOCUMENTS

| | | |
|---|---|---|
| Re. 31,029 | 9/1982 | Schael . |
| 602,823 | 4/1898 | Buck et al. . |
| 629,377 | 7/1899 | Leland . |
| 633,368 | 9/1899 | Riddick, Jr. . |
| 742,254 | 10/1903 | Stern . |
| 2,145,535 | 1/1939 | Vokes . |
| 2,170,074 | 8/1939 | Hewitt ........................ 55/491 |
| 2,279,699 | 4/1942 | White . |
| 2,583,812 | 1/1952 | Briggs et al. . |
| 2,598,818 | 6/1952 | Muirhead . |
| 2,644,586 | 7/1953 | Cutter . |
| 3,002,870 | 10/1961 | Belgarde et al. . |
| 3,136,723 | 6/1964 | Erwin et al. . |
| 3,266,229 | 8/1966 | Witkowski . |
| 3,347,390 | 10/1967 | Tietz et al. . |
| 3,370,711 | 2/1968 | Hitzelberger et al. . |
| 3,503,511 | 3/1970 | Spitzberg . |
| 3,891,416 | 6/1975 | Leonard et al. . |
| 3,920,553 | 11/1975 | Cilento ........................ 210/232 |
| 3,932,153 | 1/1976 | Byrns ........................... 210/445 |
| 3,957,644 | 5/1976 | Edmonson . |
| 3,979,295 | 9/1976 | Markley ....................... 210/445 |
| 4,062,781 | 12/1977 | Strauss et al. . |
| 4,116,845 | 9/1978 | Swank . |
| 4,148,732 | 4/1979 | Burrow et al. ............... 210/445 |
| 4,257,894 | 3/1981 | Barney . |
| 4,283,289 | 8/1981 | Meyst et al. . |
| 4,287,065 | 9/1981 | Raines .......................... 210/445 |
| 4,444,661 | 4/1984 | Jackson et al. .............. 210/446 |
| 4,557,834 | 12/1985 | Mason . |
| 4,689,144 | 8/1987 | Holmes ........................ 210/446 |
| 4,728,421 | 3/1988 | Moddemeyer . |
| 4,731,178 | 3/1988 | Rosenberg ................... 210/446 |
| 4,798,676 | 1/1989 | Matkovich ................... 210/445 |
| 4,806,217 | 2/1989 | Rosenberg ................... 210/232 |
| 4,874,513 | 10/1989 | Chakraborty et al. ...... 210/445 |

FOREIGN PATENT DOCUMENTS

| | | |
|---|---|---|
| 8404050 | of 1984 | European Pat. Off. . |
| 2940144 | of 1979 | Fed. Rep. of Germany . |
| 841818 | 7/1960 | United Kingdom . |
| 1119024 | 7/1968 | United Kingdom . |
| 1201156 | 8/1970 | United Kingdom . |
| 1542668 | 3/1979 | United Kingdom . |
| 2094652 | 9/1982 | United Kingdom . |
| 2181967 | 5/1987 | United Kingdom . |

OTHER PUBLICATIONS

Advertisement describing Type 7700-12, "Disposable Liquid Filter", Balston Ltd.
Photographs of Components Assembled by Vibration Welding.

*Primary Examiner*—Robert A. Dawson
*Assistant Examiner*—W. L. Walker
*Attorney, Agent, or Firm*—Leydig, Voit & Mayer

[57] ABSTRACT

The disclosure describes a filtering apparatus and a method for manufacturing a filtering apparatus comprising a housing and a filter arrangement disposed within the housing. The housing may have first and second identical body portions. The filter arrangement, which may include an end cap and a filter element, may be secured within the housing solely by mechanical compression between the first and second body portions.

23 Claims, 2 Drawing Sheets

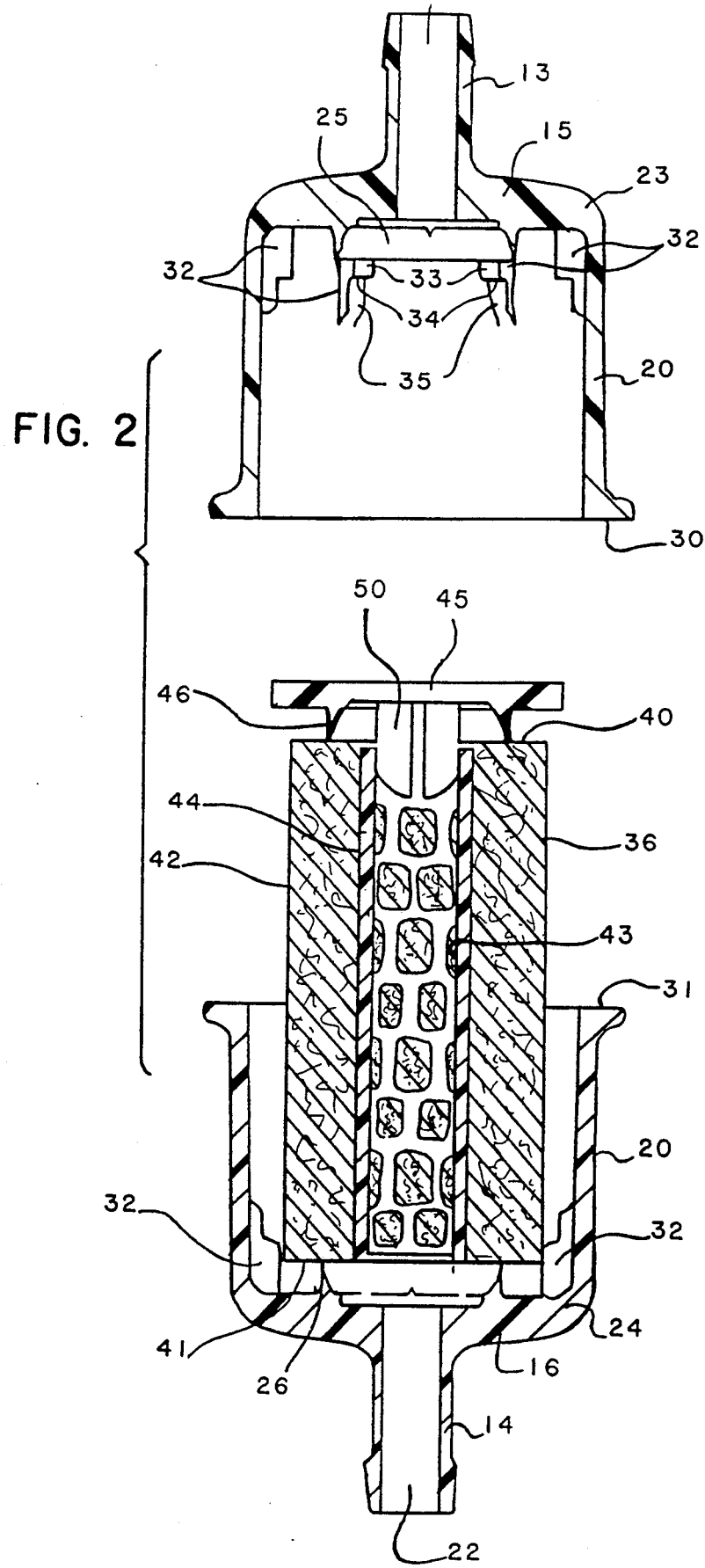

FILTERING APPARATUS

This application is a continuation of application Ser. No. 07/895,239, filed Jun. 8.1992 which is a continuation of prior application Ser. No. 07/357,258, filed May 26, 1989, both of which are now abandoned.

TECHNICAL FIELD

The present invention relates to filters and, more particularly, to an apparatus for filtering impurities from a fluid, i.e., a liquid or a gas, and a method of manufacturing such a filtering apparatus.

DISCLOSURE OF THE INVENTION

A fluid may contain many different impurities, and, in a variety of circumstances, these impurities must be removed before the fluid can be used. For example, in many medical applications, impurities must be filtered from a liquid before the liquid can be passed into a patient.

Ideally, a filtering apparatus for removing impurities from a fluid would be as inexpensive as possible. This is especially true in the medical field where skyrocketing costs are a major burden, and the expense of an apparatus or procedure may limit the availability of the apparatus or procedure.

Accordingly, the present invention provides an apparatus for filtering impurities from a fluid. The filtering apparatus generally comprises a housing and a filter arrangement. The housing has at least two openings and defines a fluid flow path between the two openings. The housing further has two identical body portions which are joined to one another to form the housing, and two or more ribs are provided within each body portion. The filter arrangement is positioned within the housing in the fluid flow path and includes a filter element. The filter element has one surface that communicates with one of the openings in the housing and another surface which communicates with the other opening in the housing. The filter arrangement is secured within the housing solely by mechanical compression between the two body portions, and the ribs of at least one body portion engage the filter arrangement to position the filter arrangement within the housing.

The present invention also provides a filtering apparatus comprising a housing, an end cap, and a filter element. The housing has an inlet and an outlet and defines a fluid flow path between the inlet and the outlet. The interior of the housing has first and second opposing surfaces, and a seal edge projects inwardly from the second surface of the housing, and two or more ribs are provided within the housing. The end cap is disposed within the housing, abutting a first surface of the housing. The end cap has a projecting seal edge which opposes the seal edge of the housing. The filter element, which is disposed in the fluid flow path within the housing, has an upstream surface that communicates with the inlet, a downstream surface that communicates with the outlet, and first and second ends. The first end of the filter element abuts the end cap with the seal edge of the end cap protruding into the first end of the filter element, and the second end of the filter element abuts the second end of the housing with the seal edge of the housing protruding into the second end of the filter element. The ribs engage the filter element to position the filter element within the housing.

The present invention additionally provides a filtering apparatus comprising a housing and a filter arrangement which includes a microfibrous filter element and a blind end cap. The housing is substantially cylindrical and includes a first end having an inlet, a second end having an outlet, and a side wall and defines a fluid flow path between the inlet and the outlet. The housing comprises first and second identical body portions joined to one another circumferentially along the side wall. Each body portion includes one end of the housing, an annular seal edge directed axially inwardly from the end of the housing, and a plurality of ribs. Each rib has a first surface which faces substantially radially inwardly and a second surface which faces substantially axially inwardly with respect to the housing. The filter arrangement is disposed in the fluid flow path within the housing and is secured within the housing solely by mechanical compression between the first and second body portions. The microfibrous filter element of the filter arrangement is hollow and generally cylindrical. The filter element has first and second porous ends, an outer surface which communicates with the inlet, and an inner surface which communicates with the outlet. The filter element is positioned coaxially within the housing with the second end of the filter element abutting the second end of the housing. The seal edge of the second end of the housing protrudes into the second end of the filter element, and the second end of the filter is centered by the first surfaces of the ribs at the second end of the housing. The blind end cap caps the first end of the filter element and has a seal edge which protrudes into the first end of the filter element. The end cap is disposed coaxially within the housing with the second surfaces of the ribs at the first end of the housing abutting the end cap.

Further, the present invention provides methods for manufacturing a filtering apparatus. Generally, the manufacturing methods comprise the steps of bringing one end of a filter element into contact with a first body portion having a seal edge which projects toward that end of the filter element and bringing the other end of the filter element into contact with an end cap having a seal edge which projects toward that end of the filter element. The manufacturing method also comprises the steps of joining the first body portion to a second body portion to form a housing, driving the seal edges into the respective ends of the filter element, and securing the end cap and the filter element within the housing solely by mechanical compression between the body portions. In accordance with one aspect of the invention, one manufacturing method further comprises the step of positioning the filter element within the first body portion by engaging the filter element with two or more ribs attached to the first body portion. In accordance with another aspect of the invention, a second manufacturing method further comprises positioning the end cap within a second body portion by engaging the end cap with two or more ribs attached to the second body portion.

Various aspects of the present invention each contribute to a reduction in the cost of the filtering apparatus. For example, by forming the housing from two identical body portions, the expense of making a mold for more than one body portion and the expense of separate molding procedures for more than one body portion are eliminated. By securing the filter arrangement within the housing solely by mechanical compression, the filter apparatus may be more quickly and, therefore, more inexpensively manufactured because the additional step of adhering or welding the filter arrangement to the housing is not required. Further, by abutting one end of the filter element directly against an end of the housing, the number and, therefore, the cost of components is reduced because no end cap is required on that end of the filter element.

While it is relatively inexpensive, a filtering apparatus according to the present invention is nonetheless highly reliable and effective. Mechanical compression of the filtering apparatus ensures that it remains securely in place, and the protrusion of the seal edges into the ends of the filter element prevents the fluid from bypassing the filter element as the fluid flows through the filtering apparatus.

BRIEF DESCRIPTION OF THE DRAWINGS

FIG. 2 is an exploded sectional side view of the exemplary filtering apparatus of FIG. 1.

BEST MODE FOR CARRYING OUT THE INVENTION

Figure 1:
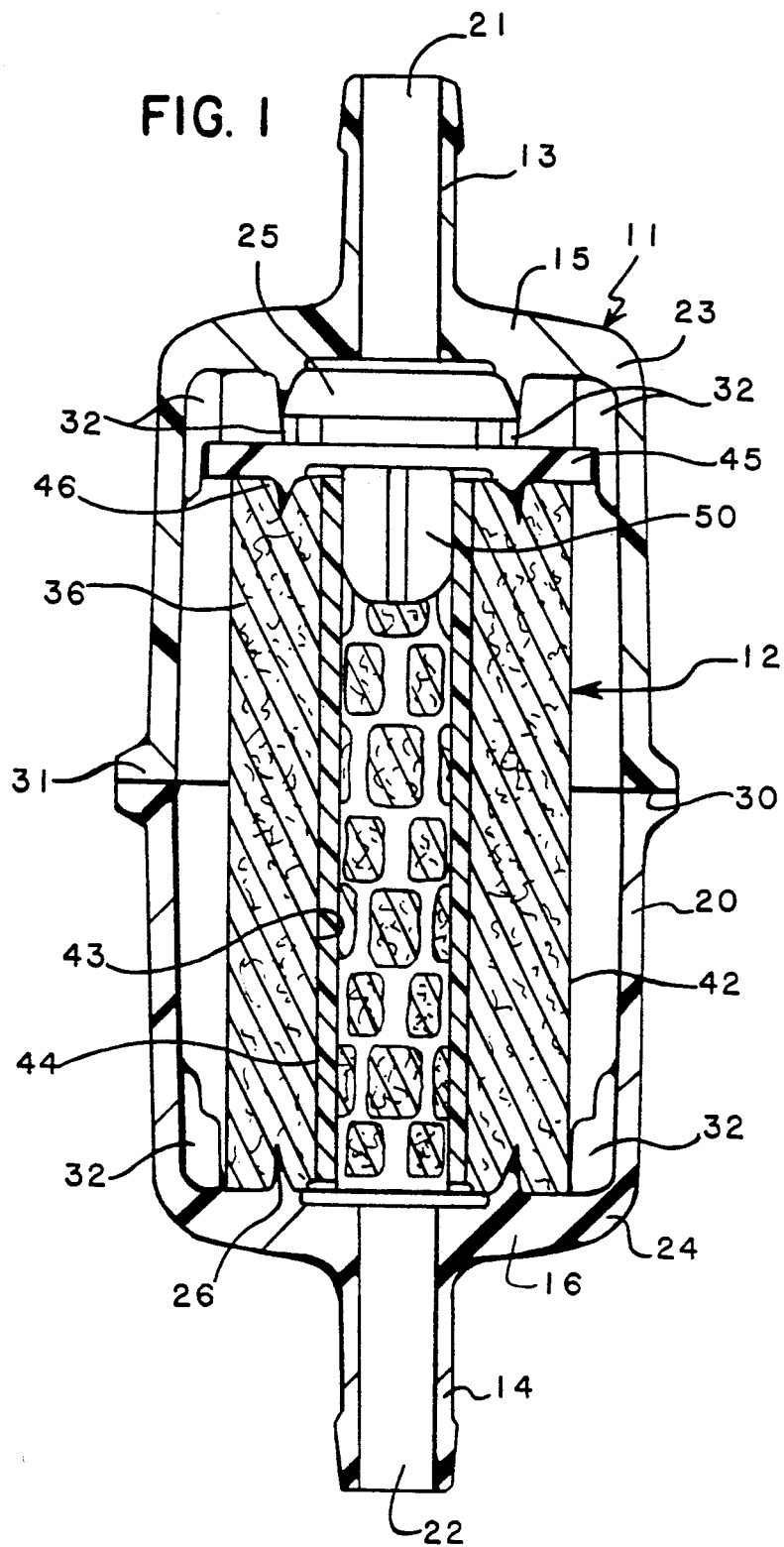
FIG. 1 is a sectional side view of an exemplary filtering apparatus according to the invention.

As shown in the figures, an exemplary filtering apparatus 10 embodying the present invention generally comprises a housing 11 and a filter arrangement 12 disposed within the housing 11. The housing 11 has an inlet 13 and an outlet 14 and defines a fluid flow path through the housing between the inlet 13 and the outlet 14. The filter arrangement 12 is positioned in the fluid flow path to remove impurities from fluid flowing through the housing 11.

The housing may have any suitable configuration and may be fashioned from any appropriately impervious material which is chemically compatible with the fluid to be filtered. In the exemplary filtering apparatus 10, the housing 11 is preferably fashioned in a generally cylindrical configuration from a polymeric material, including a thermoplastic such as polyvinylchloride, acrylonitrile butadiene styrene, polyethylene, polypropylene, or polyamide. The housing 11 has an inlet end 15 which includes the inlet 13, an outlet end 16 which includes the outlet 14, and a side wall 20 which extends between the inlet and outlet ends 15, 16. The inlet 13 and the outlet 14 are disposed coaxially with respect to the housing 11 and each may be formed as any suitable connector. For example, the inlet and the outlet may be formed as threaded connectors or "quick release" connectors. In the exemplary filter assembly 11, the inlet 13 and the outlet 14 are formed as hose connectors, each comprising a cylindrical protrusion having an exterior lip and a central opening 21, 22 which communicates between the outside and inside of the housing 11.

In accordance with one aspect of the invention, the housing is formed from first and second body portions, preferably identical body portions. In the exemplary filtering apparatus 10, the housing 11 is formed from an inlet body portion 23 and an identical outlet body portion 24 joined to one another at join faces 30, 31 extending circumferentially about the side wall 20 of the housing 11. Each body portion 23, 24 includes one end 15, 16 of the housing 11 and a seal edge 25, 26 which projects axially inwardly from the interior of the housing 11. Preferably, each seal edge 25, 26 is formed integrally with the housing 11 and has a generally annular configuration encircling the opening 21, 22 of the inlet 13 or the outlet 14.

In accordance with another aspect of the invention, the filtering apparatus further includes a structure for properly positioning and securing the filter arrangement within the housing. This structure may be variously configured including, for example, as an annular boss along the interior of the housing. In the exemplary filtering apparatus 10, the housing 11 includes a plurality of ribs 32 positioned at each end 15, 16 of the housing 11, preferably integrally formed with the housing 11. Although the ribs may be formed in a variety of shapes, each rib 32 of the exemplary filtering apparatus 10 has a "stepped" configuration including three different surfaces. The first surface 33 depicted in FIG. 2 is nearest the end 15, 16 of the housing 11 at which the rib 32 is located and faces substantially radially inwardly. The second surface 34 is generally perpendicular to the first surface 33 and faces substantially axially inwardly. The third surface 35 is generally perpendicular to the second surface 34, is closer to the side wall 20 of the housing 11 than the first surface 33, and faces substantially radially inwardly.

The filter arrangement may be variously configured without departing from the scope of the invention. For example, it may be designed for axial flow or radial inside-out flow; it may include a pleated element or a porous membrane; or it may include a sorbent material for sorbing certain impurities. In the exemplary filtering apparatus 10, the filter arrangement 12 includes a hollow, generally cylindrical filter element 36 coaxially disposed within the housing 11 and designed for radial outside-in flow. The filter element 36 includes first and second porous ends 40, 41, an outer surface 42 which communicates with the inlet 13, and an inner surface 43 which communicates with the outlet 14. The filter element 36 may comprise any suitable filter medium and may have any appropriate absolute pore rating for removing impurities. For example, in the exemplary filtering apparatus 10, the filter medium may comprise a cylindrical mass of polymeric microfibers, such as that available from Pall Corporation under the trademark PROFILE, and may have an absolute pore rating in the range from about 90 microns to less than 1 micron.

The exemplary filtering apparatus 10 also includes a perforated core 44 and a blind end cap 45. The perforated core 44 may be positioned circumjacent to the inner surface 43 of the filter element 36 to support the filter element 36 against the forces associated with the pressure drop across the filter element 36. The blind end cap caps the first end 40 of the filter element 36. The blind end cap includes a generally annular seal edge 46 which protrudes into the first end 40 of the filter element 36, opposing the seal edge 26 on the outlet end 16 of the housing 11 which protrudes into the second end 41 of the filter element 36. The end cap 45 also includes a centering tongue 50 which fits within the core 44 to center the end cap 45 on the first end 40 of the filter element 36.

In accordance with another aspect of the invention, the filter arrangement 12 is secured within the housing 11 solely by mechanical compression between first and second surfaces of the housing 11. For example, in the exemplary filtering apparatus 10, the filter arrangement 12 is secured between a first surface which comprises the plurality of second surfaces 34 of the ribs 32 at the inlet end 15 of the housing 11 and a second surface which comprises the interior surface of the outlet end 16 of the housing 11. The end cap 45 abuts but is not joined to the plurality of second surfaces 34 of the ribs 32 while the second end 41 of the filter element abuts but is not joined to the interior surface of the outlet end 16 of the housing 11. Further, the end cap 45 abuts but is not joined to the first end 40 of the filter element 36.

In accordance with another aspect of the invention, an exemplary method of manufacturing a filtering apparatus, such as the exemplary filtering apparatus 10, generally comprises bringing one end of a filter element into contact with a body portion having a seal edge which projects toward that end of the filter element and bringing the other end of the filter element into contact with an end cap having a seal edge which projects toward that end of the filter element. For example, the outlet body portion 24 of the housing 11 may be placed in the lower rest of a hot plate welding machine with the join face 31 of the outlet body portion 24 facing upwardly. The filter element 36 may then be placed in the outlet body portion 24 with the second end 41 of the filter element resting on the seal edge 26 of the outlet body portion 24. The first surfaces 33 of the ribs 32 on the outlet body portion 24 serve to center the filter element coaxially within the housing 11. The end cap 45 may then be placed on the first end 40 of the filter element 36 with the centering tongue 50 positioned in the core 44 and the seal edge 46 of the end cap 45 resting on the first end 40 of the filter element 36. To stabilize this partial assembly, the welding machine may include a support rod which extends through the outlet opening 22 and the outlet 14 and through the center of the core 44 and engages the centering tongue 50 of the end cap 45.

Alternatively, the inlet body portion 23 may be placed in the lower rest of a hot plate welding machine with the join face 30 facing upwardly. The blind end cap 45 may then be placed on the plurality of second surfaces 34 of the ribs 32 on the inlet body portion 23. The third surfaces 35 of the ribs 32 serve to center the end cap 45 in tne inlet body portion 23. The first end 40 of the filter element 36 may then be placed on the seal edge 46 of the end cap 45 with the centering tongue 50 positioned within the core 44.

The exemplary method of manufacturing the filtering apparatus further comprises joining the first body portion to a second body portion to form a housing, driving the seal edges into the respective ends of the filter element, and securing the end cap and the filter element within the housing solely by mechanical compression between the body portions. For example, if the filter element 36 and the end cap 45 have been placed in the outlet body portion 24 in the lower rest, the inlet body portion 23 may be placed over the outlet body portion 24 with the respective join faces 30, 31 facing one another. A hot plate may be brought into contact with the join faces 30, 31 for a predetermined amount of time sufficient to soften or melt the join faces 30, 31. The join faces 30, 31 are then forced together, joining the inlet body portion 23 to the outlet body portion 24. Alternatively, if the end cap 45 and the filter element 36 have been placed in the inlet body portion 23 in the lower rest, the outlet body portion 24 may be placed over the inlet body portion 23 with the respective join faces 31, 30 facing one another. A hot plate may be brought into contact with the join faces 31, 30 for a predetermined amount of time sufficient to soften or melt the join faces 31, 30. The join faces 31, 30 are then forced together, joining the outlet body portion 24 to the inlet body portion 23. The join faces 30, 31 may alternatively be joined in any other suitable manner including, for example, sonic welding, vibration welding, spin bonding, bonding by an adhesive, or molding a circumferential collar around the join faces 30, 31.

As the join faces 30, 31 are forced toward one another, the third surfaces 35 of the ribs 32 in the inlet body portion 23 center the end cap 45 within the inlet body portion 23, and the second surfaces 34 of the ribs 32 contact the end cap 45. As the join faces 30, 31 are further forced toward one another, the filter arrangement 12 is compressed between the inlet and outlet body portions 23, 24, driving the seal edge 46 of the end cap 45 and the seal edge 26 of the outlet body portion 24 into the first and second ends 40, 41 of the filter element 36. Alternatively, the seal edge 46 of the end cap 45 may have been driven into the first end 40 of the filter element 36 before the filter element 36 was placed in the outlet body portion 24.

In accordance with the invention, the housing 11 is dimensioned such that once the join faces 30, 31 are joined to one another, the filter arrangement 12 is tightly secured solely by mechanical compression between the inlet and outlet body portions 23, 24. For example, in the exemplary filtering apparatus 10, the filter arrangement 12 is tightly secured between the second surfaces 35 of the ribs 32 in the inlet body portion 23 and the interior surface of the outlet end 16 of the housing 11 with the first and second ends 40, 41 of the filter element 36 tightly wedged against the end cap 45 and the outlet end 16 of the housing 11.

In the preferred mode of operation, the hose connectors of the inlet 13 and the outlet 14 of the exemplary filtering apparatus 10 may be attached to hoses (not shown) of a fluid system. Fluid to be filtered may then be directed into the exemplary filtering apparatus 10 to the inlet 13 where it is diverted by the end cap 45 to the outer, upstream surface 42 of the filter element 36. The fluid is then forced radially inwardly through the filter medium of the filter element 36 where the impurities are removed from the fluid. The fluid is prevented from flowing around the first end 40 of the filter element 36 and bypassing the filter medium of the filter element 36 by the seal formed between the first end 40 of the filter element 36 and the end cap 45. Likewise, the fluid is prevented from flowing around the second end 41 of the filter element 36 and bypassing the filter medium of the filter element 36 by the seal formed between the second end 41 of the filter element 36 and the outlet end 16 of the housing 11. The filtrate exits the filter element 36 at the inner, downstream surface 43, passes through the perforated core 44, and then flows axially through the outlet 14.

A filtering apparatus according to the present invention may be used in a variety of applications. For example, the filtering apparatus may be used to filter liquids such as water and, specifically, as a prefilter for the water supply of a dialysis machine. Because the filtering apparatus is relatively inexpensive, it may be frequently replaced to prevent the accumulation of impurities, such as harmful bacteria. More generally, the filtering apparatus may be used as a filter for drink dispensers or as a general purpose filter for filtering a variety of fluids in laboratories.

While the invention has been described in connection with a preferred embodiment of a filtering apparatus and a preferred method for manufacturing a filtering apparatus, there is no intent to limit the invention to the preferred embodiment or method. On the contrary, the intent is to cover all alternatives, modifications, and equivalents which may be included within the spirit and scope of the invention as defined by the appended claims.

I claim:

1. An apparatus for filtering a fluid comprising:
a housing having first and second openings and defining a fluid flow path between the first and second openings, the housing further having first and second identical body portions joined to one another and a plurality of ribs provided within each body portion, and
a filter arrangement disposed within the housing in the fluid flow path and including a filter element having a first surface communicating with the first opening and a second surface communicating with the second opening, the filter arrangement being secured within the housing solely by mechanical compression between the first and second body portions and the ribs of at least one body portion engaging the filter arrangement to position the filter arrangement within the housing.

2. The filtering apparatus of claim 1 wherein the housing includes a first end having the first opening and a second end having the second opening and wherein each body portion includes one end of the housing.

3. The filtering apparatus of claim 2 wherein each body portion further includes a seal edge projecting inwardly from the end of the housing and encircling the opening, the seal edge of at least one body portion protruding into the filter element.

4. The filtering apparatus of claim 2 wherein the ribs of each body portion are disposed near the end of the housing, each rib having first and second substantially perpendicular surfaces, the filter arrangement being compressed between the second end of the housing and the second surfaces of the ribs of the first end of the housing and the filter element being centered by the first surfaces of the ribs of the second end of the housing.

5. The filtering apparatus of claim 4 wherein the filter element has first and second ends, wherein the filter arrangement further includes an end cap capping the first end of the filter element, and wherein each rib further includes a third surface substantially perpendicular to the second surface, the second surfaces of the ribs of the first end of the housing abutting the end cap and the end cap being centered by the third surfaces of the ribs of the first end of the housing.

6. The filtering apparatus of claim 5 wherein the end cap includes a projecting seal edge and wherein the seal edge of the end cap and the seal edge of the second end of the housing respectively protrude into the first and second ends of the filter element.

7. The filtering apparatus of claim 5 wherein the end cap is secured to the filter element solely by mechanical compression between the first end of the filter element and the second surfaces of the ribs of the first end of the housing.

8. An apparatus for filtering a fluid comprising:
a housing having an inlet and an outlet and defining a fluid flow path between the inlet and the outlet, the housing further having first and second opposing surfaces disposed on the interior of the housing, a seal edge projecting inwardly from the second surface, and a plurality of ribs provided within the housing;
an end cap disposed within the housing near the first surface of the housing and having a projecting seal edge opposing the seal edge of the housing; and
a filter element disposed in the fluid flow path within the housing, the filter element having an upstream surface communicating with the inlet, a downstream surface communicating with the outlet, and first and second ends, the first end of the filter element abutting the end cap with the seal edge of the end cap protruding into the first end of the filter element, the second end of the filter element abutting the second surface of the housing with the seal edge of the housing protruding into the second end of the filter element, and the ribs engaging the filter element to position the filter element within the housing.

9. The filtering apparatus of claim 8 wherein the end cap and the filter element are secured within the housing solely by mechanical compression between the first and second opposing surfaces of the housing.

10. The filtering apparatus of claim 9 wherein the end cap is secured to the filter element solely by means of mechanical compression between the housing and the first end of the filter element.

11. The filtering apparatus of claim 8 wherein the filter element comprises a hollow, generally cylindrical mass of fibers.

12. The filtering apparatus of claim 11 wherein the mass of fibers comprises a PROFILE filter medium.

13. The filtering apparatus of claim 8 wherein the housing further includes first and second ends and the plurality of ribs are disposed near each end of the housing, each rib having third and fourth generally perpendicular surfaces, wherein the end cap abuts the plurality of third surfaces of the ribs near the first end of the housing, and wherein the upstream surface of the filter element faces the fourth surfaces of the ribs near the second end of the housing.

14. The filtering apparatus of claim 13 wherein each rib further includes a fifth surface generally perpendicular to the third surface, the end cap being centered by the plurality of fifth surfaces near the ribs of the first end of the housing.

15. An apparatus for filtering a fluid comprising:
a substantially cylindrical housing including a first end having an inlet, a second end having an outlet, and a side wall and defining a fluid flow path between the inlet and the outlet, the housing comprising first and second identical body portions joined to one another circumferentially along the side wall, each body portion including one end of the housing, an annular seal edge directed axially inwardly from the end of the housing, and a plurality of ribs, each rib having a first surface facing substantially radially inwardly and a second surface facing substantially axially inwardly with respect to the housing; and
a filter arrangement disposed in the fluid flow path within the housing and secured within the housing solely by mechanical compression between the first and second body portions, the filter arrangement including:
a hollow, generally cylindrical, microfibrous filter element having first and second porous ends, an outer surface communicating with the inlet, and an inner surface communicating with the outlet, the filter element being disposed coaxially within the housing with the second end of the filter element abutting the second end of the housing, the seal edge of the second end of the housing protruding into the second end of the filter element, and the second end of the filter element being centered by the first surfaces of the ribs of the second end of the housing, and a blind end cap capping the first end of the filter element and having a seal edge protruding into the first end of the filter element, the end cap being disposed coaxially within the housing with the second surfaces of the ribs of the first end of the housing abutting the end cap.

16. The filtering apparatus of claim 15 wherein the end cap is secured to the filter element solely by mechanical compression between the second surfaces of the ribs of the first body portion and the first end of the filter element.

17. The filtering apparatus of claim 16 wherein the first and second body portions are welded to one another.

18. A method for manufacturing a filtering apparatus comprising the steps of:

bringing the first end of a filter element into contact with a first body portion having a seal edge projecting toward the first end of the filter element;

positioning the filter element within the first body portion by engaging the filter element with a plurality of ribs attached to the first body portion;

bringing a second end of the filter element into contact with an end cap having a seal edge projecting toward the second end of the filter element;

joining the first body portion to a second body portion to form a housing;

driving the seal edges into the respective ends of the filter element; and securing the end cap and the filter within the housings solely by mechanical compression between the body portions.

19. The manufacturing method of claim 18 further comprising the step of securing the end cap to the filter element solely by means of mechanical compression between one body portion and the filter element.

20. The manufacturing method of claim 18 wherein the step of positioning the filter element within the body portion includes engaging the exterior of the filter element with the plurality of ribs.

21. The manufacturing method of claim 18 further comprising the step of positioning the end cap within the second body portion by engaging the end cap with a plurality of ribs attached to the second body portion.

22. A method for manufacturing a filtering apparatus comprising the steps of:

placing a first body portion with a join face facing upwardly into the lower rest of a hot plate welding machine;

bringing the first end of a filter element into contact with the first body portion, the first body portion having a seal edge projecting toward the first end of the filter element;

bringing the second end of the filter element into contact with an end cap having a seal edge projecting toward the second end of filter element;

joining the first body portion to a second body portion to form a housing, including bringing the join faces into contact with the hot plate for a predetermined time; and driving the seal edges into the respective ends of the filter element and securing the end cap and the filter element within the housing solely by mechanical compression between the body portions.

23. A method for manufacturing a filtering apparatus comprising the steps of:

bringing a first end of a filter element into contact with a first body portion having a seal edge projecting toward the first end of the filter element;

bringing a second end of the filter element into contact with an end cap having a seal edge projecting toward the second end of the filter element;

positioning the end cap within a second body portion by engaging the end cap with a plurality of ribs attached to the second body portion;

driving the seal edges into the respective ends of the filter element;

joining the first body portion to the second body portion to form a housing; and securing the end cap and the filter element within the housing solely by mechanical compression between the body portions.

* * * * *